United States Patent
Vejlgaard et al.

(10) Patent No.: US 11,888,573 B2
(45) Date of Patent: Jan. 30, 2024

(54) METHODS AND APPARATUS

(71) Applicant: NOKIA TECHNOLOGIES OY, Espoo (FI)

(72) Inventors: Benny Vejlgaard, Gistrup (DK); Simon Svendsen, Aalborg (DK); Nuno Manuel Kiilerich Pratas, Gistrup (DK)

(73) Assignee: Nokia Technologies Oy, Espoo (FI)

( * ) Notice: Subject to any disclaimer, the term of this patent is extended or adjusted under 35 U.S.C. 154(b) by 160 days.

(21) Appl. No.: 17/593,024

(22) PCT Filed: Mar. 5, 2019

(86) PCT No.: PCT/EP2019/055430
§ 371 (c)(1),
(2) Date: Sep. 3, 2021

(87) PCT Pub. No.: WO2020/177860
PCT Pub. Date: Sep. 10, 2020

(65) Prior Publication Data
US 2022/0278737 A1     Sep. 1, 2022

(51) Int. Cl.
*H04B 7/06* (2006.01)
*H04B 7/08* (2006.01)
*H04B 7/0456* (2017.01)

(52) U.S. Cl.
CPC ......... *H04B 7/0814* (2013.01); *H04B 7/0482* (2013.01); *H04B 7/0608* (2013.01); *H04B 7/0617* (2013.01)

(58) Field of Classification Search
None
See application file for complete search history.

(56) References Cited

U.S. PATENT DOCUMENTS

| | | | |
|---|---|---|---|
| 2010/0222012 A1* | 9/2010 | Shibuya | H04B 17/336 455/79 |
| 2020/0366430 A1* | 11/2020 | Yu | H04B 7/08 |

FOREIGN PATENT DOCUMENTS

| | | |
|---|---|---|
| EP | 2226955 A2 | 9/2010 |
| EP | 3413543 A1 | 12/2018 |
| JP | 2010206357 A | 9/2010 |
| JP | 2015146568 A | 8/2015 |
| JP | 2017017388 A | 1/2017 |
| WO | 2013095229 A1 | 6/2013 |

OTHER PUBLICATIONS

International Search Report and Written Opinion for International Application No. PCT/EP2019/055430, dated Jan. 7, 2020, 11 pages.
Office Action for India Application No. 202147044361, dated Mar. 30, 2022, 6 pages.
Office Action for Japanese Application No. 2021-552828, dated Oct. 26, 2022, 5 pages.

* cited by examiner

*Primary Examiner* — Minh Trang T Nguyen
(74) *Attorney, Agent, or Firm* — Brake Hughes Bellermann LLP

(57) ABSTRACT

An apparatus comprises means for: determining that one or more antenna elements of an antenna array are being disrupted; and updating one or more parameters associated with one or more antenna elements in response to determining that one or more antenna elements of said array are being disrupted.

20 Claims, 17 Drawing Sheets

T1 Determine that one or more antenna elements of an antenna array are being disrupted T2 Update one or more parameters associated with one or more antenna elements in response to determining that one or more antenna elements of the antenna array are being disrupted.

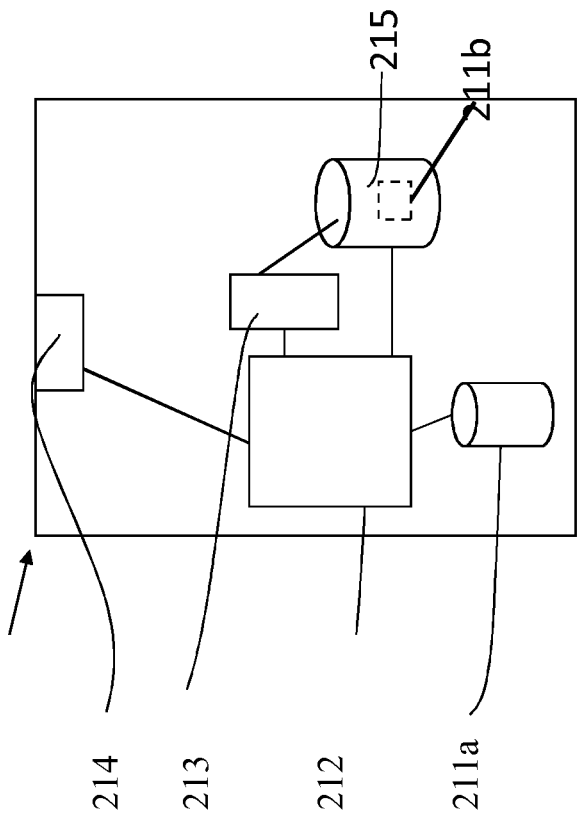
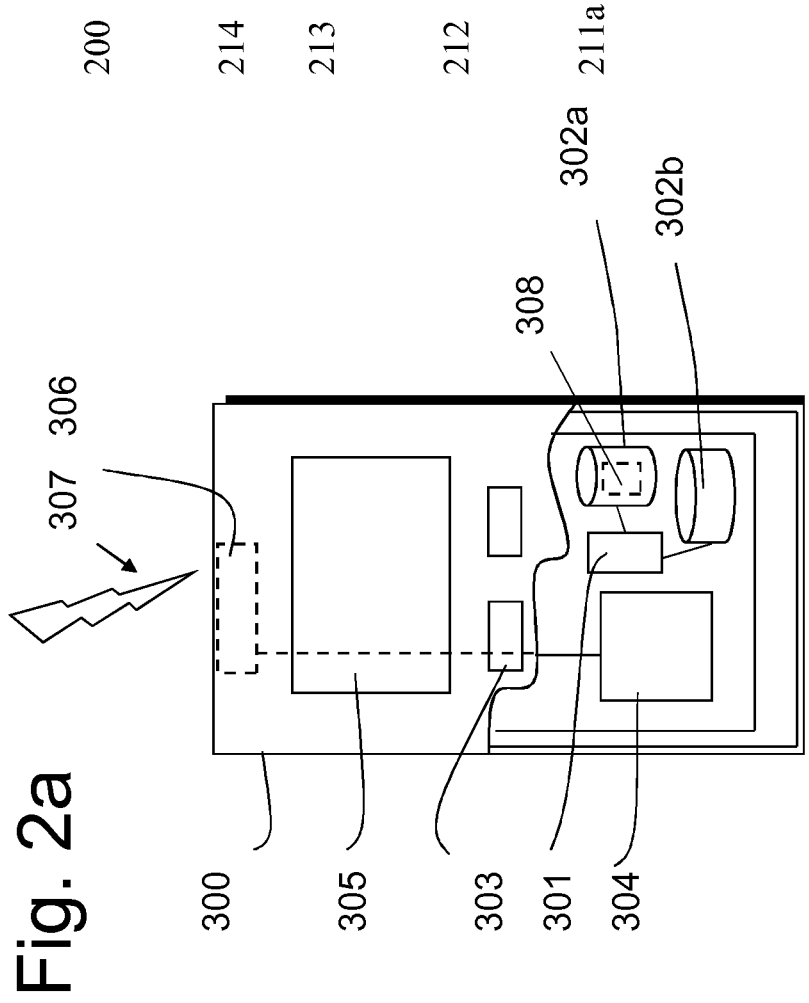

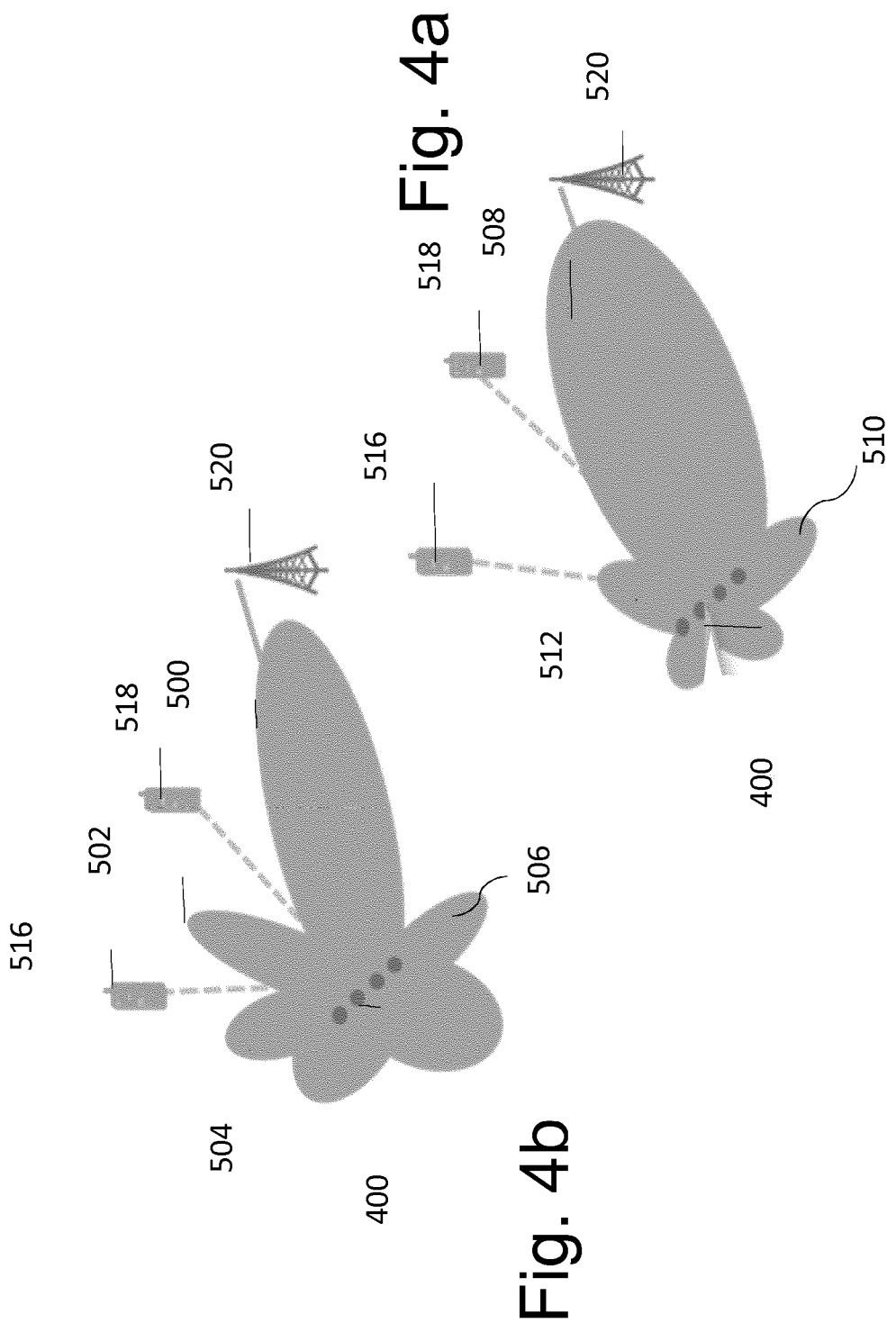

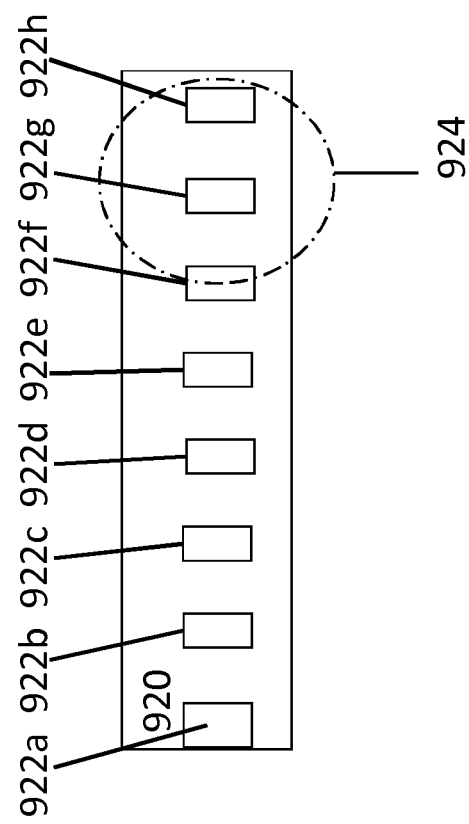

METHODS AND APPARATUS

CROSS-REFERENCE TO RELATED APPLICATIONS

This application is a national stage entry of International Application No. PCT/EP2019/055430, filed Mar. 5, 2019, entitled "METHODS AND APPARATUS" which is hereby incorporated by reference in its entirety.

FIELD OF THE DISCLOSURE

The present disclosure relates to an apparatus, methods, and computer programs and in particular but not exclusively for apparatus, methods and computer programs to be used in a communications system.

BACKGROUND

A communication system can be seen as a facility that enables communication sessions between two or more entities such as user terminals, base stations/access points and/or other nodes by providing carriers between the various entities involved in the communications path. A communication system can be provided for example by means of a communication network and one or more compatible communications devices.

Access to the communication system may be by means of an appropriate communications device or terminal. A communications device is provided with an appropriate signal receiving and transmitting apparatus for enabling communications, for example enabling access to a communication network or communications directly with other communications devices. The communications device may access a carrier provided by a station or access point, and transmit and/or receive communications on the carrier.

The communication system and associated devices typically operate in accordance with a given standard or specification which sets out what the various entities associated with the system are permitted to do and how that should be achieved.

SUMMARY

According to an aspect, there is provided an apparatus comprising means for: determining that one or more antenna elements of an antenna array are being disrupted; and updating one or more parameters associated with one or more antenna elements in response to determining that one or more antenna elements of said array are being disrupted.

The means may be for updating one or more parameters by altering at least one of a power and phase applied to a signal provided to one or more of said antenna elements. The means may be for updating one or more parameters by altering at least one of a gain and phase applied to a signal received from one or more of said antenna elements.

The means may be for updating one or more parameters by switching off one or more antenna elements.

The means may be for updating one or more parameters by reducing a power of a signal provided to one or more of said one or more antenna elements that are being disrupted.

The means may be for reducing a gain applied to a signal received from one or more of said one or more antenna elements that are being disrupted.

The means may be for using an updated set of codebook entries in response to determining that one or more antenna elements of the antenna array are being disrupted, said updated set of codebook entries updating said one or more parameters.

The means may be for causing information about the one or more antenna elements of the antenna array that are being disrupted to be transmitted to a base station and in response receiving information on said updated set of codebook entries.

The means may be for determining an updated set of codebook entries in response to determining that one or more antenna elements of the antenna array are being disrupted.

The means may be for determining that one or more antenna elements of the antenna array are being disrupted in dependence on a reflection constant for at least one antenna element.

The means may be for comparing said reflection constant to at least one threshold to determine one or more antenna elements of the antenna array are being disrupted.

The means may be for determining the reflection constant in dependence on a power of at least one signal.

The means may be for determining the reflection constant in dependence on an amplitude of at least one signal.

The means may be for determining the reflection constant in dependence on a complex impedance associated with a signal. One or more thresholds in the complex domain may be used.

The means may be for determining the reflection constant in dependence on an amplitude and phase of at least one signal.

The means may be for determining that one or more antenna elements of the array are being disrupted in dependence on one or more of a forward and a reverse power associated with one or more antenna elements.

The means may be for determining that one or more antenna elements of the array are being disrupted in dependence on one or more of a power reflected by one or more antenna elements and a power put into one or more antenna elements.

The means may be for determining that one or more antenna elements of the antenna array are being disrupted in dependence on an amplitude of at least one signal.

The means may be for receiving information on said at least one threshold from a base station.

The means may be for determining said at least one threshold.

The apparatus may be provided in a communications device or may be a communications device. Some of the previously described apparatus may be provided in a base station or be a base station.

According to another aspect there is provided an apparatus comprising at least one processor and at least one memory including computer code for one or more programs, the at least one memory and the computer code configured, with the at least one processor, to cause the apparatus at least to: determine that one or more antenna elements of an antenna array are being disrupted; and update one or more parameters associated with one or more antenna elements in response to determining that one or more antenna elements of said array are being disrupted.

The at least one memory and the computer code may be configured, with the at least one processor, to cause the apparatus to update one or more parameters by altering at least one of a power and phase applied to a signal provided to one or more of said antenna elements.

The at least one memory and the computer code may be configured, with the at least one processor, to cause the apparatus to update one or more parameters by altering at least one of gain and phase applied to a signal received from one or more of said antenna elements.

The at least one memory and the computer code may be configured, with the at least one processor, to cause the apparatus to update one or more parameters by switching off one or more antenna elements.

The at least one memory and the computer code may be configured, with the at least one processor, to cause the apparatus to update one or more parameters by reducing a power of a signal provided to one or more of said one or more antenna elements that are being disrupted.

The at least one memory and the computer code may be configured, with the at least one processor, to cause the apparatus to update one or more parameters by reducing a gain applied to a signal received from one or more of said one or more antenna elements that are being disrupted.

The at least one memory and the computer code may be configured, with the at least one processor, to cause the apparatus to use an updated set of codebook entries in response to determining that one or more antenna elements of the antenna array are being disrupted, said updated set of codebook entries updating said one or more parameters.

The at least one memory and the computer code may be configured, with the at least one processor, to cause the apparatus to cause information about the one or more antenna elements of the antenna array that are being disrupted to be transmitted to a base station and in response receiving information on said updated set of codebook entries.

The at least one memory and the computer code may be configured, with the at least one processor, to cause the apparatus to determine an updated set of codebook entries in response to determining that one or more antenna elements of the antenna array are being disrupted.

The at least one memory and the computer code may be configured, with the at least one processor, to cause the apparatus to determine that one or more antenna elements of the antenna array are being disrupted in dependence on a reflection constant for at least one antenna element.

The at least one memory and the computer code may be configured, with the at least one processor, to cause the apparatus to compare said reflection constant to at least one threshold to determine one or more antenna elements of the antenna array are being disrupted.

The at least one memory and the computer code may be configured, with the at least one processor, to cause the apparatus to determine the reflection constant in dependence on a power of at least one signal.

The at least one memory and the computer code may be configured, with the at least one processor, to cause the apparatus to determine the reflection constant in dependence on an amplitude of at least one signal.

The at least one memory and the computer code may be configured, with the at least one processor, to cause the apparatus to determine the reflection constant in dependence on a complex impedance associated with a signal. One or more thresholds in the complex domain may be used.

The at least one memory and the computer code may be configured, with the at least one processor, to cause the apparatus to determine the reflection constant in dependence on an amplitude and phase of at least one signal.

The at least one memory and the computer code may be configured, with the at least one processor, to cause the apparatus to determine that one or more antenna elements of the array are being disrupted in dependence on one or more of a forward and a reverse power associated with one or more antenna elements.

The at least one memory and the computer code may be configured, with the at least one processor, to cause the apparatus to determine that one or more antenna elements of the array are being disrupted in dependence on one or more of a power reflected by one or more antenna elements and a power put into one or more antenna elements.

The at least one memory and the computer code may be configured, with the at least one processor, to cause the apparatus to determine that one or more antenna elements of the antenna array are being disrupted in dependence on an amplitude of at least one signal.

The at least one memory and the computer code may be configured, with the at least one processor, to cause the apparatus to receiving information on said at least one threshold from a base station.

The at least one memory and the computer code may be configured, with the at least one processor, to cause the apparatus to determine said at least one threshold.

The apparatus may be provided in a communications device or may be a communications device. Some of the previously described apparatus may be provided in a base station or be a base station.

According to an aspect there is provided an apparatus comprising circuitry configured to: determine that one or more antenna elements of an antenna array are being disrupted; and update one or more parameters associated with one or more antenna elements in response to determining that one or more antenna elements of said array are being disrupted.

The circuitry may be configured to update one or more parameters by altering at least one of a power and phase applied to a signal provided to one or more of said antenna elements.

The circuitry may be configured to update one or more parameters by altering at least one of a gain and phase applied to a signal received from one or more of said antenna elements.

The circuitry may be configured to update one or more parameters by switching off one or more antenna elements.

The circuitry may be configured to update one or more parameters by reducing a power of a signal provided to one or more of said one or more antenna elements that are being disrupted.

The circuitry may be configured to update one or more parameters by reducing a gain applied to a signal received from one or more of said one or more antenna elements that are being disrupted.

The circuitry may be configured to use an updated set of codebook entries in response to determining that one or more antenna elements of the antenna array are being disrupted, said updated set of codebook entries updating said one or more parameters.

The circuitry may be configured to cause information about the one or more antenna elements of the antenna array that are being disrupted to be transmitted to a base station and in response receiving information on said updated set of codebook entries.

The circuitry may be configured to determine an updated set of codebook entries in response to determining that one or more antenna elements of the antenna array are being disrupted.

The circuitry may be configured to determine that one or more antenna elements of the antenna array are being disrupted in dependence on a reflection constant for at least one antenna element.

The circuitry may be configured to compare said reflection constant to at least one threshold to determine one or more antenna elements of the antenna array are being disrupted.

The circuitry may be configured to determine said reflection constant in dependence on a power of at least one signal.

The circuitry may be configured to determine said reflection constant on an amplitude of at least one signal.

The circuitry may be configured to determine said reflection constant on a complex impedance associated with a signal. One or more thresholds in the complex domain may be used.

The circuitry may be configured to determine said reflection constant in dependence on an amplitude and phase of at least one signal.

The circuitry may be configured to determine that one or more antenna elements of the array are being disrupted in dependence on one or more of a forward and a reverse power associated with one or more antenna elements.

The circuitry may be configured to determine that one or more antenna elements of the array are being disrupted in dependence on one or more of a power reflected by one or more antenna elements and a power put into one or more antenna elements.

The circuitry may be configured to determine that one or more antenna elements of the antenna array are being disrupted in dependence on an amplitude of at least one signal.

The circuitry may be configured to receive information on said at least one threshold from a base station.

The circuitry may be configured to determine said at least one threshold.

The apparatus may be provided in a communications device or may be a communications device. Some of the previously described apparatus may be provided in a base station or be a base station.

According to an aspect, there is provided an apparatus comprising means for: receiving information from a communications device that one or more antenna elements of an antenna array of the communications device are being disrupted; and causing update information to be transmitted to said communications device, said update information comprising update information about one or more parameters associated with one or more antenna elements of said array of said communications device.

The update information may comprise information about at least one of a power and phase to be applied to a signal provided to one or more of said antenna elements.

The update information may comprise information about at least one of a gain and phase to be applied to a signal received from one or more of said antenna elements.

The update information may comprise an updated set of codebook entries.

The means may be for determining an updated set of codebook entries in response to said information received from the communications device.

The means may be for causing information on at least one threshold to be transmitted to said communications device, said at least one threshold being for use by the communications device to determine if at least one antenna element is being disrupted.

The means may be for determining at least one threshold, said at least one threshold being for use by the communications device to determine if at least one antenna element is being disrupted.

The apparatus may be provided in a base station or be a base station.

According to another aspect there is provided an apparatus comprising at least one processor and at least one memory including computer code for one or more programs, the at least one memory and the computer code configured, with the at least one processor, to cause the apparatus at least to: receive information from a communications device that one or more antenna elements of an antenna array of the communications device are being disrupted; and cause update information to be transmitted to said communications device, said update information comprising update information about one or more parameters associated with one or more antenna elements of said array of said communications device.

The update information may comprise information about at least one of a power and phase to be applied to a signal provided to one or more of said antenna elements.

The update information may comprise information about at least one of a gain and phase to be applied to a signal received from one or more of said antenna elements.

The update information may comprise an updated set of codebook entries.

The at least one memory and the computer code may be configured, with the at least one processor, to cause the apparatus to determine an updated set of codebook entries in response to said information received from the communications device.

The at least one memory and the computer code may be configured, with the at least one processor, to cause the apparatus to cause information on at least one threshold to be transmitted to said communications device, said at least one threshold being for use by the communications device to determine if at least one antenna element is being disrupted.

The at least one memory and the computer code may be configured, with the at least one processor, to cause the apparatus to determine at least one threshold, said at least one threshold being for use by the communications device to determine if at least one antenna element is being disrupted.

The apparatus may be provided in a base station or be a base station.

According to an aspect, there is provided an apparatus comprising circuitry configured to: receive information from a communications device that one or more antenna elements of an antenna array of the communications device are being disrupted; and cause update information to be transmitted to said communications device, said update information comprising update information about one or more parameters associated with one or more antenna elements of said array of said communications device.

The update information may comprise information about at least one of a power and phase to be applied to a signal provided to one or more of said antenna elements.

The update information may comprise information about at least one of a gain and phase to be applied to a signal received from one or more of said antenna elements.

The update information may comprise an updated set of codebook entries.

The circuitry may be configured to determine an updated set of codebook entries in response to said information received from the communications device.

The circuitry may be configured to cause information on at least one threshold to be transmitted to said communications device, said at least one threshold being for use by the communications device to determine if at least one antenna element is being disrupted.

The circuitry may be configured to determine at least one threshold, said at least one threshold being for use by the communications device to determine if at least one antenna element is being disrupted.

The apparatus may be provided in a base station or be a base station.

According to an aspect, there is provided a method comprising: determining that one or more antenna elements of an antenna array are being disrupted; and updating one or more parameters associated with one or more antenna elements in response to determining that one or more antenna elements of said array are being disrupted.

The method may comprise updating one or more parameters by altering at least one of a power and phase applied to a signal provided to one or more of said antenna elements.

The method may comprise updating one or more parameters by altering at least one of a gain and phase applied to a signal received from one or more of said antenna elements.

The method may comprise updating one or more parameters by switching off one or more antenna elements.

The method may comprise updating one or more parameters by reducing a power of a signal provided to one or more of said one or more antenna elements that are being disrupted.

The method may comprise updating one or more parameters by reducing a gain applied to a signal received from one or more of said one or more antenna elements that are being disrupted.

The method may comprise using an updated set of codebook entries in response to determining that one or more antenna elements of the antenna array are being disrupted, said updated set of codebook entries updating said one or more parameters.

The method may comprise causing information about the one or more antenna elements of the antenna array that are being disrupted to be transmitted to a base station and in response receiving information on said updated set of codebook entries.

The method may comprise determining an updated set of codebook entries in response to determining that one or more antenna elements of the antenna array are being disrupted.

The method may comprise determining that one or more antenna elements of the antenna array are being disrupted in dependence on a reflection constant for at least one antenna element.

The method may comprise comparing said reflection constant to at least one threshold to determine one or more antenna elements of the antenna array are being disrupted.

The method may comprise determining the reflection constant in dependence on a power of at least one signal.

The method may comprise determining the reflection constant in dependence on an amplitude of at least one signal.

The method may comprise determining the reflection constant in dependence on a complex impedance associated with a signal. One or more thresholds in the complex domain may be used.

The method may comprise determining the reflection constant in dependence on an amplitude and phase of at least one signal.

The method may comprise determining that one or more antenna elements of the array are being disrupted in dependence on one or more of a forward and a reverse power associated with one or more antenna elements.

The method may comprise determining that one or more antenna elements of the array are being disrupted in dependence on one or more of a power reflected by one or more antenna elements and a power put into one or more antenna elements.

The method may comprise determining that one or more antenna elements of the antenna array are being disrupted in dependence on an amplitude of at least one signal.

The method may comprise receiving information on said at least one threshold from a base station.

The method may comprise determining said at least one threshold.

The methods may be performed in an apparatus of a communications device or in a communications device.

Some of the previously described methods may be provided in an apparatus in a base station or in a base station.

According to an aspect, there is provided method comprising: receiving information from a communications device that one or more antenna elements of an antenna array of the communications device are being disrupted; and causing update information to be transmitted to said communications device, said update information comprising update information about one or more parameters associated with one or more antenna elements of said array of said communications device.

The update information may comprise information about at least one of a power and phase to be applied to a signal provided to one or more of said antenna elements.

The update information may comprise information about at least one of a gain and phase to be applied to a signal received from one or more of said antenna elements.

The update information may comprise an updated set of codebook entries.

The method may comprise determining an updated set of codebook entries in response to said information received from the communications device.

The method may comprise causing information on at least one threshold to be transmitted to said communications device, said at least one threshold being for use by the communications device to determine if at least one antenna element is being disrupted.

The method may comprise determining at least one threshold, said at least one threshold being for use by the communications device to determine if at least one antenna element is being disrupted.

The method may be performed in an apparatus of a base station or in a base station.

According to an aspect there is provided a computer program comprising computer executable code which when run on at least one processor is configured to cause any of the previously described methods to be performed.

According to an aspect, there is provided a computer readable medium comprising program instructions stored thereon for performing at least one of the above methods.

According to an aspect, there is provided a non-transitory computer readable medium comprising program instructions stored thereon for performing at least one of the above methods.

According to an aspect, there is provided a non-volatile tangible memory medium comprising program instructions stored thereon for performing at least one of the above methods.

In the above, many different aspects have been described. It should be appreciated that further aspects may be provided by the combination of any two or more of the aspects described above.

Various other aspects are also described in the following detailed description and in the attached claims.

BRIEF DESCRIPTION OF THE FIGURES

Embodiments will now be described, by way of example only, with reference to the accompanying Figures in which:

FIG. 2a shows a schematic representation of a communications device;

FIG. 2b shows an apparatus of a base station;

FIGS. 4a and 4b show some example beams formed by the transceiver;

FIG. 12a shows a plot for the antenna array of FIG. 8a;

FIG. 14 shows a 1×8 antenna array with interference from a user;

DETAILED DESCRIPTION OF THE FIGURES

In the following certain embodiments are explained with reference to communications devices capable of communication via a wireless cellular system and communication systems serving such communications devices. Before explaining in detail the exemplifying embodiments, certain general principles of a wireless communication system, access systems thereof, and communications devices are briefly explained with reference to FIGS. 1 to 4 to assist in understanding the technology underlying the described examples.

Figure 1:
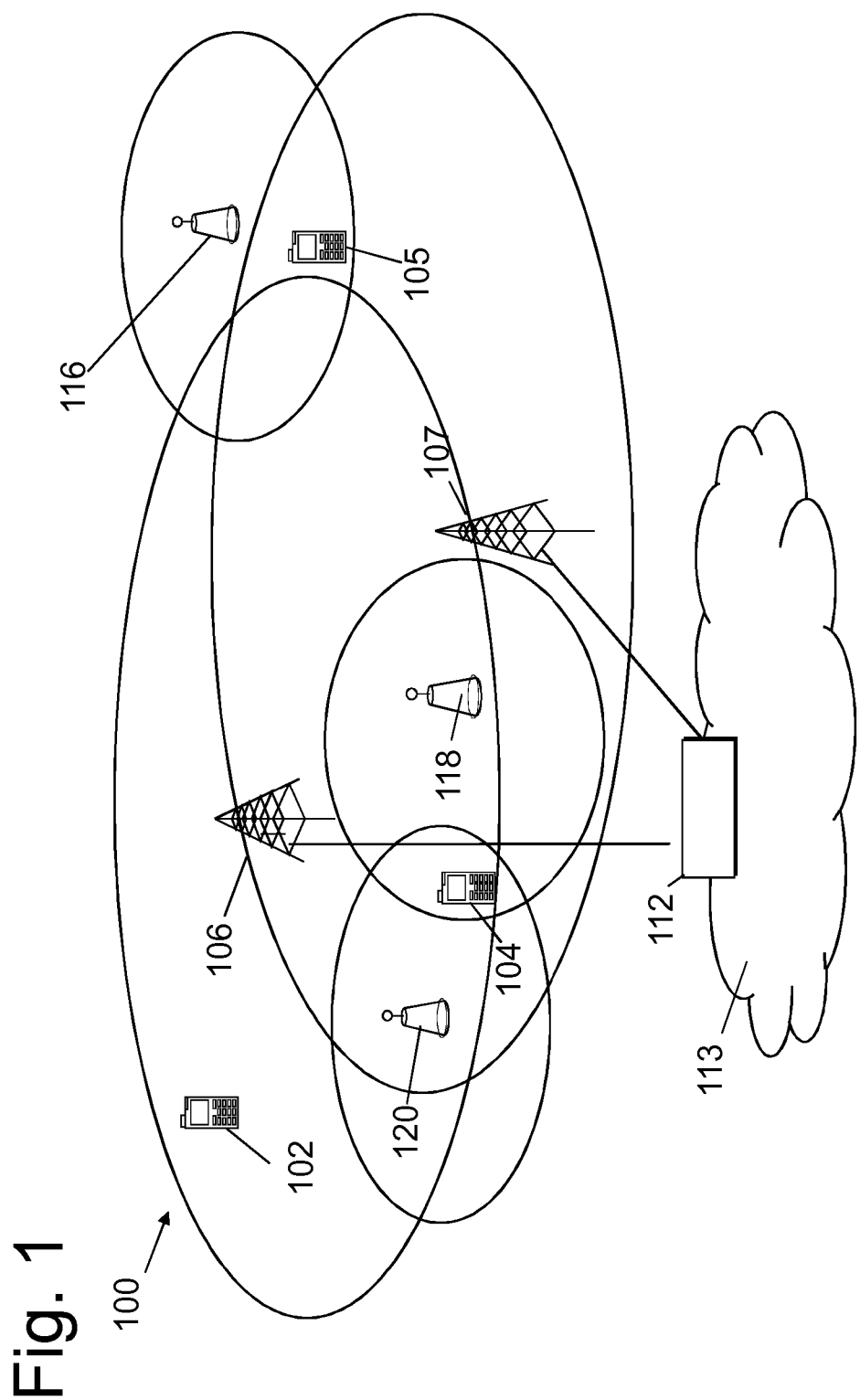
FIG. 1 shows a schematic representation of a communication system.

Reference is made to FIG. 1 which shows an example system 100 in which some embodiments may be provided. The system may be a wireless communications system. In a wireless communication system 100, such as that shown in FIG. 1, communication devices or user equipment (UE) 102, 104, 105 are provided. These communications devices will be referred to as UEs but it should be appreciated that the device may be any suitable communications device and the term UE is intended to cover any such device. Some examples of communications devices are discussed below and as used in this document the term UE is intended to cover any one or more of those devices and/or any other suitable device.

The UEs may be provided wireless access via at least one base station (or similar wireless transmitting and/or receiving node or point.

In FIG. 1, there are base stations 106 and 107 which serve relatively large cells. Smaller base stations 116, 118 and 120 may also be provided. The smaller base stations 116, 118 and 120 may be pico or femto level base stations or the like. In some embodiments, the smaller base stations may not be provided.

One or more of the base stations may communicate with a network 113 via one or more network functions 112. One or more of the base stations may communicate with the network via one or more other base stations. For example, one or more smaller base stations may communicate with a network via one or more of the large base stations.

The communication devices 102, 104, 105 may access the communication system based on various access techniques, such as code division multiple access (CDMA), or wideband CDMA (WCDMA). Other non-limiting examples comprise time division multiple access (TDMA), frequency division multiple access (FDMA) and various schemes thereof such as the interleaved frequency division multiple access (IF-DMA), single carrier frequency division multiple access (SC-FDMA) and orthogonal frequency division multiple access (OFDMA), space division multiple access (SDMA) and so on.

An example of wireless communication systems are architectures standardized by the 3rd Generation Partnership Project (3GPP). One 3GPP based development is often referred to as the long term evolution (LTE) of the Universal Mobile Telecommunications System (UMTS) radio-access technology. Some developments of LTE are referred to as LTE Advanced (LTE-A). The LTE (LTE-A) employs a radio mobile architecture known as the Evolved Universal Terrestrial Radio Access Network (E-UTRAN) and a core network known as the Evolved Packet Core (EPC). Base stations of such systems are known as evolved or enhanced Node Bs (eNBs). Another example of a suitable communications system is the 5G or New Radio (NR) concept. Base stations of NR systems may be known as next generation Node Bs (gNBs). The base station may be a ng-eNB. Other examples of radio access system comprise those provided by base stations of systems that are based on technologies such as wireless local area network (WLAN) and/or WiMAX (Worldwide Interoperability for Microwave Access). A base station can provide coverage for an entire cell or similar radio service area.

FIG. 2a illustrates an example of a communications device 300, such as the wireless communications device 102, 104 or 105 shown on FIG. 1. The wireless communications device 300 may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, machine-type communications (MTC) devices, IoT type communications devices or any combinations of these or the like.

The device 300 may receive signals over an air or radio interface 307 via appropriate apparatus for receiving and may transmit signals via appropriate apparatus for transmitting radio signals. In FIG. 2a transceiver apparatus is designated schematically by block 306. The transceiver apparatus 306 may be provided for example by means of a radio part and associated antenna arrangement. The antenna arrangement may be arranged internally or externally to the mobile device. In some embodiments, a plurality of transceivers may be provided by the transceiver apparatus.

The wireless communications device 300 may be provided with at least one processor 301 and at least one memory. The at least one memory may comprise at least one ROM 302a and/or at least one RAM 302b. The communications device may comprise other possible components 303 for use in software and hardware aided execution of tasks it is designed to perform, including control of access to and communications with access systems and other communications devices. The at least one processor 301 is coupled to the at least one memory. The at least one processor 301 may be configured to execute an appropriate software code 308 to implement one or more of the following aspects. The software code 308 may be stored in the at least one memory, for example in the at least one ROM 302b.

The processor, storage and other relevant control apparatus can be provided on an appropriate circuit board and/or in chipsets. This feature is denoted by reference 304.

The device may optionally have a user interface such as key pad 305, touch sensitive screen or pad, combinations thereof or the like.

Optionally one or more of a display, a speaker and a microphone may be provided depending on the type of the device.

An example apparatus 200 is shown in FIG. 2b. The apparatus shown in FIG. 2b may be provided in a base station. The apparatus comprises at least one memory. The at least one memory may be at least one random access memory (RAM) 211a and/or at least one read only memory (ROM) 211b, at least one processor 212, 213 and an input/output interface 214. The at least one processor 212, 213 is coupled to the RAM 211a and the ROM 211b. The at least one processor 212, 213 may be configured to execute an appropriate software code 215 to implement one or more of the following aspects. The software code 215 may be stored in the ROM 211b.

Communication protocols and/or parameters which shall be used for the connection are also typically defined. The communications devices may access the communication system based on various access techniques.

In some embodiments, multiple antennas and/or a plurality of antenna arrays may be provided. By way of example only, multiple antennas and/or a plurality of antenna arrays may be used in 5G NR both for the gNB and the UE. Using multiple antennas and/or a plurality of antenna arrays may provide the option to increase system performance by using an additional antenna gain provided by joint beamforming of the antenna elements in these antenna arrays.

In some embodiments, the antenna arrays may be used with the mmW frequency range of 5G NR (mmWave- e.g. above 6 GHz). In some embodiments, the range of frequencies may be between 24 to 70 GHz (or even up to 114 GHz).

It should be appreciated that in other embodiments, frequencies below 6 GHz may be used with some embodiments. The use of a plurality of antenna arrays may compensate for the increased free space loss at the high frequencies. Antenna arrays may have a reduced radiation beam width, which may limit the area/coverage. The reduced coverage may be counteracted by utilizing beam steering where antenna array radiation beam is tilted in the direction of the gNB or the UE.

It has been proposed to use an open loop beam steering mechanism for the gNB and the UE. This mechanism may utilize predefined codebooks to change the spatial direction (azimuth and/or longitude) of the beam generated by the antenna array. The codebooks may be device dependent. The codebooks may be determined in idealized free space conditions. The codebooks may contain information of the different phase and/or amplitude settings for the different antenna elements in the array, to steer the beam in different spatial directions.

Figure 3A:
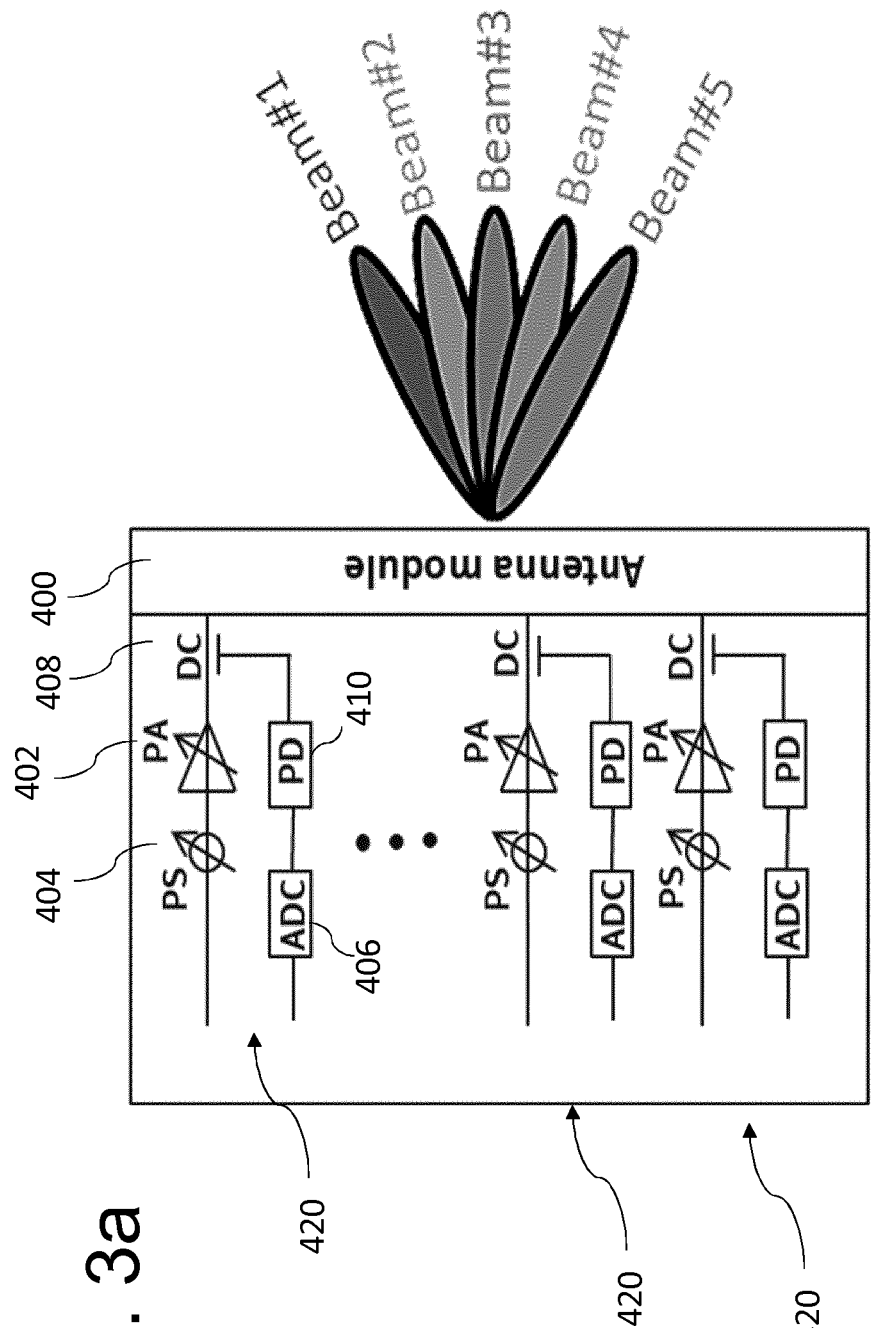
FIG. 3a shows part of a transceiver of the communications device.

Reference is made to FIG. 3a which shows the components of the RF front end used to detect a disruption of one or more antenna elements. An antenna array 400 is provided. In this example, the receive RX paths use the same antenna element as the transmit TX path. This may be in one or both TDD (time division duplex) and FDD (frequency division duplex) operation modes. This means that a reciprocal assignment of the most suitable antenna elements for RX path may be made based on those detected from TX path.

Each antenna element in the array has its own dedicated circuitry 420. The antenna array is configured to generate a beam pattern comprising one or more beams where the shape, size and number of beams is controlled by the phase and gain used for each of the antennas. (It should be appreciated that in other embodiments, two or more antenna elements may share circuitry).

Figure 3B:
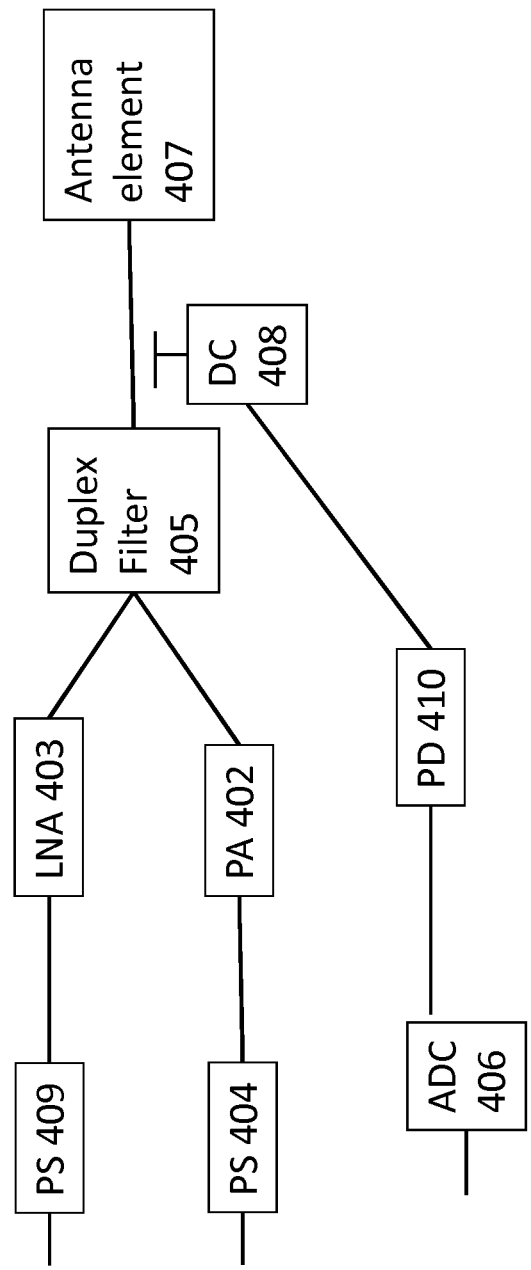
FIG. 3b shows a transceiver path for a frequency division duplex antenna element.
Figure 3C:
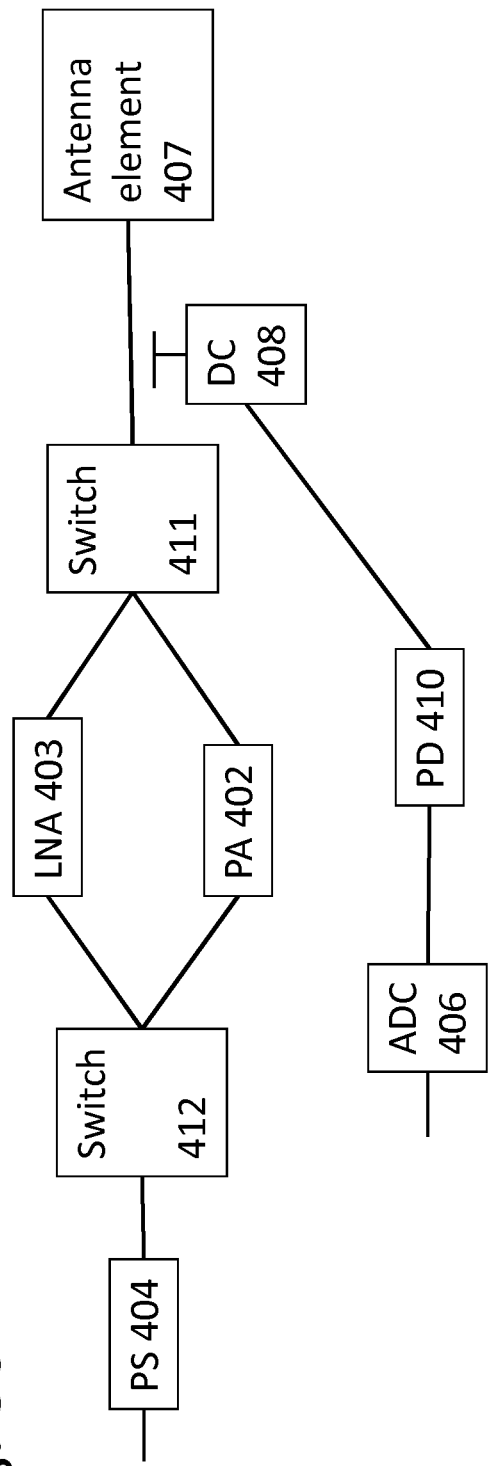
FIG. 3c shows a transceiver path for a time division duplex antenna element.

Reference is made to FIGS. 3b and FIG. 3c which show different examples of the dedicated circuitry 420. FIG. 3b shows a transmit path with the PA and the receive path with a low noise amplifier LNA for a FDD mode. FIG. 3c shows a transmit path with the PA and the receive path with a LNA for a TDD mode.

The circuitry comprises an analog to digital converter ADC 406, a power detector PD 410 and a directional coupler DC 408. This will be discussed in more detail later.

The circuitry 420 comprises a power amplifier PA 402 and a phase shifter PS 404. The PA 402 and PS 404 are arranged in series with the PS upstream of the PA. However, in other embodiments, the PA may be upstream of the PS. Changing the phase of the phase shifter PS and/or the gain of the power amplifier PA can be used the control the radiation pattern of the arrays, to increase the gain in a specific direction towards the gNB and/or to create one or more nulls towards other interfering devices. The PA is used to control the gain and the phase shifter is used to control the phase for a respective antenna.

Referring to FIG. 3b, the components for the receive path are also shown. A duplex filter 405 is provided which passes the output signals from the PA 402 to the antenna element 407 to be transmitted. The signals which are received from the antenna element 407 are passed by the duplex filter 405 to the receive path which comprises a low noise amplifier 403 and a phase shifter 409.

Referring to FIG. 3c, the components for the receive path are also shown. A first switch 412 and a second switch 411 are provided with the PA 402 and the LNA arranged in parallel between the two switches. When a signal is to be transmitted the switches are arranged such that a signal from the PS 404 passes through the PA 402 and the to the antenna element. When a signal is to be received, the switches are arranged such that a signal from the antenna element passes to the LNA 403 and then to the PS 404.

Reference is made to FIG. 4. FIG. 4 shows two example beam patterns generated by the antenna array 400 of a user device.

FIG. 4a shows a first example pattern generated by the antenna array 400 with the primary beam 508 or main lobe directed to the base station 520 and with two smaller beams 510 and 512 (side lobes). There are two communication devices 516 and 518 which may be interfering and/or interfered with. As can be seen, one device 516 is in the main direction of the smaller beam 512. The other device is partially in the path of the primary beam 508.

In contrast, FIG. 4b shows a second pattern generated by the antenna array 400 with the primary beam 500 directed to the base station 520 and with three smaller beams 502, 506 and 506. There are again two devices 516 and 518 which may be interfering and/or interfered with. As can be seen, the device 516 is in the null region between the two smaller beams 502 and 506. The second device 518 is the null region between one of the smaller beams 502 and the main beam 518. The primary beam is narrower as compared to the arrangement of FIG. 4a and more focused towards the base station 520.

The distance between the elements in an antenna array may be between 0.5 and 0.7λ apart where λ is the wavelength of the waves to be transmitted and/or received. This may maximize the theoretical achievable gain from the array while limiting the occurrence of grating lobes. It should be appreciated that this spacing is by way of example only and different embodiments may use different spacing. In some embodiments, there may be different spacing between adjacent elements.

An increase in the number of antenna elements will also increase the theoretically achievable gain. A one directional antenna array (1 dimension), 1 times x amount of antenna elements, will be able to steer the radiation beam in the direction of the length of the array, while a 2-directional array (2 dimensions) will be able to steer the radiation beam in both directions of the array. The array may be a N×M array. N may represent the number of rows and M the number of antenna elements in each row. N may be, for example, 1, 2, 4, 8, 12 or 16. M may be, for example, 2, 4, 8, 12 or 16. N and M may have any other suitable value in other embodiments. It should be appreciated that in other embodiments, any other suitable antenna layout may be used.

Each of the elements in the array may be dual polarized in order to enable 2×2 MIMO (multiple input multiple output) per beam. This may be achieved by using the orthogonal polarizations and in theory may be able to double the achievable throughput. The orthogonality or cross polar discrimination (XPD) of the antenna array is a design parameter, which depends on the current beam steering configuration and/or the direction of arrival of the transmission.

Consider the following example. The wave length at 26 GHz is 12.5 mm. Some array designs for 5G NR consist of half-wave patch antennas which are suited for dual orthogonal polarization designs. Other embodiments may use any other suitable antenna elements such as dipole or monopole elements.

Some example antenna array sizes are summarized in the table below for both 26 GHz and 2.7 GHz. A ½ wave length have been added around the patches of the array for the ground plane and the element spacing is 0.5λ in this example.

| Array Configuration | Physical Size @ 26 GHz | Physical Size @ 2.7 GHz |
|---|---|---|
| 1 × 4 | ≈(10 × 31) mm | ≈(100 × 220) mm |
| 1 × 8 | ≈(10 × 59) mm | ≈(100 × 440) mm |
| 2 × 4 | ≈(19 × 31) mm | ≈(165 × 220) mm |
| 4 × 4 | ≈(31 × 31) mm | ≈(220 × 220) mm |

The physical size of the antenna array may allow the user to cover/disrupt, typically with a finger, some of the elements in the antenna array. This may degrade the performance of the array, since the codebook parameters are based on the characteristics of the individual antenna elements in free-space (i.e. without near field obstructions). In this regard, reference is made to FIG. 5 and FIG. 6.

Figure 5:
FIG. 5 shows a beam pattern formed with no interference from, for example, a user.

FIG. 5 shows a desired beam arrangement from a UE. The desired beam arrangement has a main lobe 606. On each side of the main lobe 606 there are two side lobes 602 with a null 604 between the side lobes 602.

Figure 6:
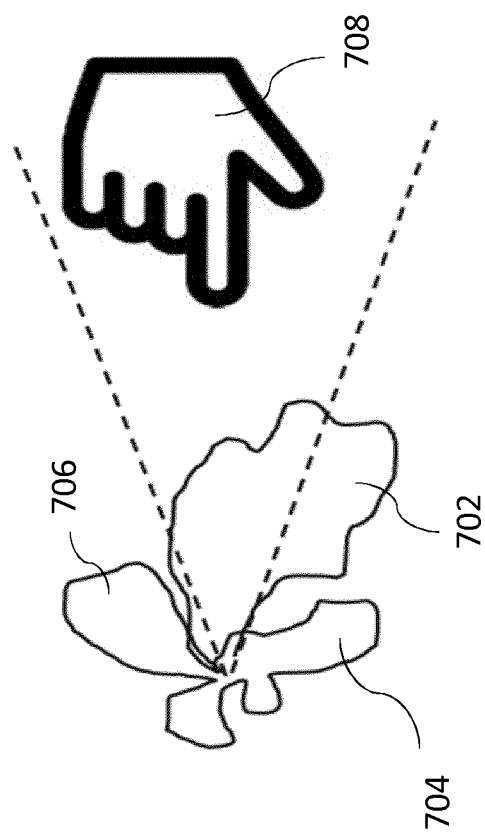
FIG. 6 shows a beam pattern formed with interference from, for example, a user.

FIG. 6 shows the desired beam arrangement when a user has caused a disturbance. As can be seen the disturbed main lobe 702 is irregular. It is smaller than the main lobe of FIG. 5. The side lobes 704 and 706 have become distorted are not symmetrical.

The disturbance provided by the user may have one or more of the following consequences:

The antenna gain of the array may be reduced. This may have the effect of reducing coverage and the achievable link throughput;

The XPD of the array may be reduced. This may have the effect of increasing the correlation between the two MIMO paths, which in turn may reduce the achievable system throughput;

The PA digital pre-distortion DPD gain may be reduced. This may have the effect of causing the transceiver chain to move to a non-linear regime. This may have the consequence of creating unwanted out-of-band emissions.

The power consumption may remain the same. This may have the effect of causing the throughput to be reduced which reduces the energy efficiency (bits/J).

Some embodiments may address the potential performance degradation caused by the user interaction (or other interaction) with the antenna array.

Some embodiments may detect which of the antenna elements are covered or disturbed. In some embodiments, those cover/disturbed antenna elements may be switched off or otherwise deactivated. This may be for receiving and/or for the transmitting of signals.

Figure 7:
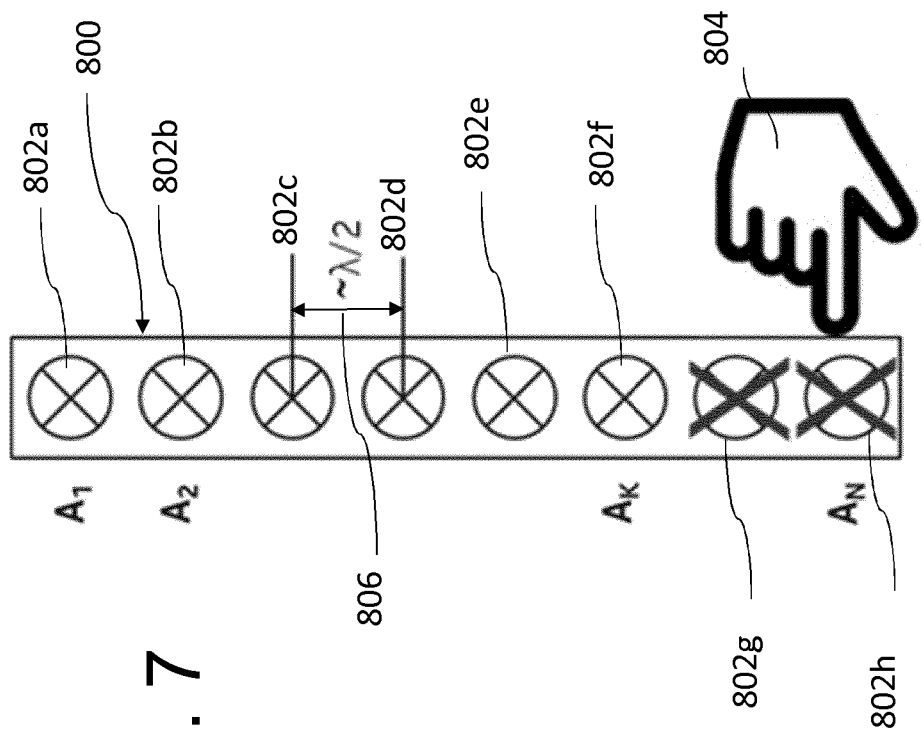
FIG. 7 shows an example antenna array in which two antenna have been deactivated.

Reference is made to FIG. 7 which shows an antenna array 800 with N antenna elements $A_1$ to $A_N$ which are referenced 802a to 802h. In this example the user 804 covers antenna elements $A_{N-1}$ and $A_N$, 802g and 802h. These antenna elements are deactivated or switched off in some embodiments. In other words, no signal is applied to the antenna element for the transmit path. The associated PS and PA may be switched off or deactivated in some embodiments. In other embodiments, no signal may be received in the receive path. The associated PS and LNA may be switched off or be inactive in some embodiments. In this embodiment, the antenna elements have a spacing 806 of the order of λ/2.

Some embodiments may provide user interference detection and dynamic switching of the antenna elements.

In some embodiments, to determine which of the antenna elements are covered, the transmission path uses the directional coupler 408, the power detector 410, and the ADC 406 shown in FIG. 3. These components allow both the forward and reverse power can be monitored. The forward power is the power going in the direction of the antenna element, while the reverse power is reflected from the antenna element. The amount of reflected power depends on how well the antenna element is matched to the impedance of the antenna. The impedance is typically 50Ω but will change when there is an obstacle in front of the antenna element. The RF front-end may be designed to have a real and constant impedance of say 50 ohm with a small imaginary component. The antenna on the other hand may have a complex impedance, which changes over frequency and may be designed to be within a certain distance (Standing Wave Ratio SWR) from the 50 ohm point in the complex domain.

The DC may be a RF directional coupler. Directional couplers are RF passive devices used to couple a specific proportion of the power travelling in one transmission line out through another connection or port. Directional couplers enabling power levels to be sensed without making a direct connection to the transmission line carrying the power. The RF directional couplers may be implemented using any suitable technique such as with stripline, coaxial feeder and/or lumped or discrete elements. RF DCs may be provided within a variety of packages from blocks with RF connectors, or solder pins, contained on a substrate carrier, or constructed as part of a larger unit containing other functions.

In some embodiments, the same antenna elements may be used for both RX and TX. The detection of badly matched (and potentially unusable) antennas may be determined based on the TX path using the associated directional couplers. The selected antennas in TX will then be used for the RX antenna selection as well.

In some embodiments, the determination if an element is being covered is based on the ratio between the reverse and forward powers (reflection constant $|\Gamma|^2$). This is the reflection constant, which given by the ratio between the reverse and forward powers (i.e. the power being reflected from the antenna and the power being put into the antenna, respectively). A $|\Gamma|^2=0$ will indicate that no power is reflected, which means that the antenna is perfectly matched. On the other hand, a $|\Gamma|^2=1$ means that all the power is reflected, and that the antenna is very badly matched. The reflection constant should be low in free space conditions, since the impedance match of the individual elements is typically optimized for the condition. An increase of the reflection constant will indicate that something (typically the user) is close to that antenna element and at some point, it might be beneficial the switch off that element and transition to an updated codebook. In some embodiments, switching off a badly matched antenna may save some current consumption.

The reflection constant may be determined in dependence on the power or amplitude. In some embodiments, the power or amplitude may be used to determine an obstacle, without determining the reflection constant.

The determining of an obstruction may alternatively be determined by measuring the complex impedance where the thresholds are areas in the complex domain.

The determining of an obstruction may alternatively be determined by measuring the amplitude and phase of the signal.

Figure 16:
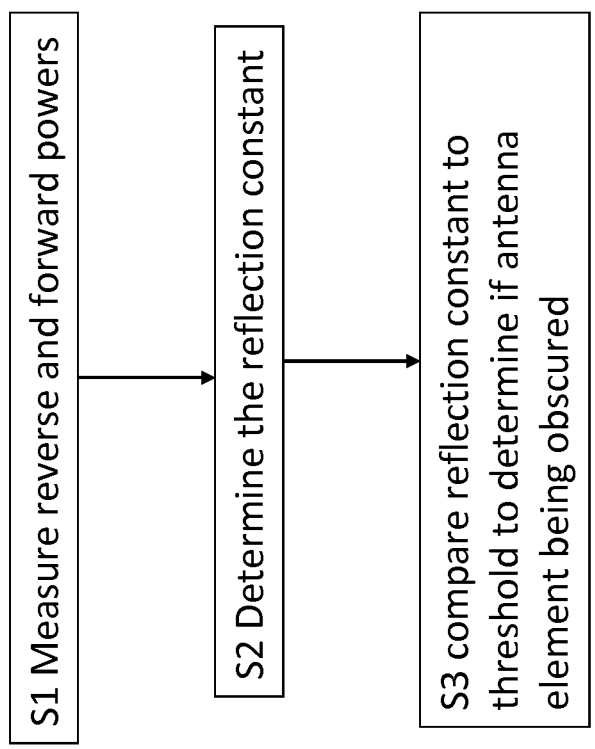
FIG. 16 shows a first method of some embodiments.

Reference is made to FIG. 16 which shows a method of some embodiments.

In step S1, an apparatus of the UE is configured to measures the reverse and forward powers.

In step S2, these values are used to determine the reflection constant. The reflection constant may be determined over time for each element (or set of elements) across all its antenna patches.

In step S3, the reflection constant is compared to a threshold to determine if the antenna element is being obscured. This may be done on a per antenna element basis or on the basis of a subset of two or more but not all antenna elements. The decision threshold may be a scalar.

In some embodiments, different thresholds may be provided for two or more different antenna elements.

This threshold may be set dynamically by the base station. The base station may send information to the UE about this threshold. In other embodiments, the threshold may be set within the UE.

The impedance seen at the different antenna array elements may change with the different codebook settings. The threshold limit may be dependent on the relative change in the impedance.

In some embodiments, phase information may be used in addition to the reflection constant to determine if an antenna element is being obscured. The phase may add one more dimension to the decision procedure (e.g. the imaginary part of the antenna complex impedance).

In some embodiments, the decision threshold for switching off an antenna element may be static (a system design parameter) or dynamic (e.g. based on previously observed statistics regarding the user interference, the device can adapt the sensitivity of the decision threshold). The threshold may be controlled locally by the UE (based on the observed statistics of the reflection constant). A plurality of threshold limits may be defined, whereby the power of the PA is being gradually reduced depending on the value of the reflection constant with respect to the threshold limits.

As the movement of the user typically occurs in a much longer timescale than the changes in the radio environment, the periodicity of this detection may occur on the timescale of a few seconds. When an antenna element is affected by a user, triggering the use of a different codebook, that element is periodically monitored to determine if the user load is still present. This monitoring cycle may be of the order of seconds, since the user induced changes are relatively slow in time.

Some embodiments may use a codebook. In some embodiments, the codebook used may be dependent on which antenna elements are active. In some embodiments, a transition is made to use a codebook that may recover some of the lost system performance, by considering the currently active and inactive elements. In the example tables below, the first codebook is the one which is used when all of the antenna elements are active and the second codebook is the one used for the example shown in FIG. 7.

| Index | $A_1$ | $A_2$ | ... | $A_N$ |
|---|---|---|---|---|
| 1 | $\Phi_{1,1}\alpha_{1,1}$ | $\Phi_{1,2}\alpha_{1,2}$ | | $\Phi_{1,N}\alpha_{1,N}$ |
| 2 | $\Phi_{2,1}\alpha_{2,1}$ | $\Phi_{2,2}\alpha_{2,2}$ | | |
| M | $\Phi_{M,1}\alpha_{M,1}$ | $\Phi_{M,2}\alpha_{M,2}$ | | $\varphi_{M,N}\alpha_{M,N}$ |

| Index | $A_1$ | $A_2$ | ... | $A_K$ | | $A_N$ |
|---|---|---|---|---|---|---|
| 1 | $\Phi_{1,1}\alpha_{1,1}$ | $\Phi_{1,2}\alpha_{1,2}$ | | $\Phi_{1,K}\alpha_{1,K}$ | X | X |
| 2 | $\Phi_{2,1}\alpha_{2,1}$ | $\Phi_{2,2}\alpha_{2,2}$ | | | X | X |
| M | $\Phi_{M,1}\alpha_{M,1}$ | $\Phi_{M,2}\alpha_{M,2}$ | | $\Phi_{M,K}\alpha_{M,K}$ | X | X |

Some embodiments may save or rebalance towards the other antenna elements the power saved from the switching off of the one or more affected elements.

Some embodiments may vary the number of active RX and TX antenna elements over time. In some embodiments, to ensure that adequate performance is maintained, transitions between codebooks are made.

There may be a code book for each possible option. The codebook may be precomputed or derived on the fly in the UE. In some embodiments, the codebook required may be provided to the UE from the base station. In some embodiments, the codebooks may be determined by the base station based on information received from the UE. The UE may comprise information about which antenna element is obscured and optionally the reflection constant and/or phase information.

The base station may be collocated with a data centre, as it is the case of cloud RAN.

The codebook consists of several entries (M), which determines the resolution from one beam shape to the next. The more entries the finer resolution between each beam enabling smoother transition from one beam to the next. However, the more entries the more space and control overhead in selecting the ideal beam. Each entry in the codebook consist of a phase ($\phi$) and gain ($\alpha$) for each antenna element. Thus, the codebook for N antenna elements contains M×N entries.

When one or more antenna elements are blocked and therefore unusable, then a new codebook needs to be put in place. This can be achieved by one or more of:

Selecting a pre-calculated codebook from a set of codebook profiles, which can be indexed via a bitmap representing the state of the antenna elements; and Real-time calculation mapping the original codebook of size M×M to a new size M×K, where K is the reduced set of antennas. One approach may be based on the assumption of channel reciprocity. The UE may tune the phase shifter at each antenna element which is still active and based on that to maximize the received RSRP (reference signal receive power) from the serving base station.

The real-time calculation of a reduced set of codebook entries may be done by simple interpolation between entries. Using the following as simplified example, consider that there are 4 antenna elements in a linear array:

A B C D

When antenna element B gets disconnected, the phasor shifts of antenna elements A, C and D are adapted to compensate for this loss. A possible way to achieve this would be to map the phasor shifts of each element to a curve indexed by the antenna element prior to the disconnect of the antenna element B. The same operation for the post disconnection of the antenna element B may then be performed. The interpolation may then be achieved by finding the new antenna phasor shifts that better approximates the original curve.

In case of a bi-dimensional array (i.e. with horizontal and vertical elements) the same approach may be applied, but instead of curves it would be surfaces.

Where the end antennas are blocked, only the central antenna elements would be considered.

Some embodiments may save power or rebalance power across antenna elements when there is one or more deactivated antenna element.

As the antenna elements are switched off, then the device may either save this power or use it with the other antenna elements. In the latter case this may allow the addition of extra transmission power to the link.

Some embodiments may be used for UE devices. Some embodiments may be used for handheld devices. Some embodiments may be useful in situations where the affected antenna array is the only array on the device or is the only array looking in the correct spatial direction.

Some embodiments may be used in base station. In this scenario, it is the obstructing object could by a bird, insect or the like.

Some embodiments may be used with handheld devices. Some embodiments may be used with all frequency ranges (where a plurality of antennas are used for beamforming). Some embodiments may enable a better performance to be achieved using a reduced set of antenna elements, avoiding those blocked by the user.

Some embodiments may have a reduced power consumption. The antenna elements blocked and interfered by the user will not radiate useful power. The power may be reduced by using only those antenna elements with useful matching.

It should be appreciated that embodiments may be alternatively or additionally applied to the receiving of signals. One or more antenna elements which are determined to be disrupted or obstructed may be switched off and/or the gain of the LNA amplifier may be reduced. One or more of the other antenna elements which are not determined to be disrupted may have an increased gain applied to the received signal by the respective LNA. A modified code book may be used with respect to the antennas elements for the receiving of signals. The modified code book may be determined as discussed in relation to the transmission of signals.

Some simulations of some embodiments will now be described with reference to the example array shown in FIGS. 8a and 8b. In this example, the antenna array 900 comprises 4 antenna elements 902a, 902b, 902c and 902d. As can be seen from FIG. 8b an object 904 obscures part of antenna element 902c and all of antenna element 902d. The following simulations assume a frequency of 3 GHz.

The antenna array has the following properties:
Ground size: 250 mm×88 mm
Patch height: 6 mm
Patch Spacing: 0.5λ
Substrate: $\varepsilon_r$ (relative permittivity)=3.0 & tan δ (dielectric loss tangent)=0.005 Hand @ 3 Ghz: $\varepsilon_r$=24.8 & σ (conductivity measured in Siemens per meter)=1.61 S/m
Distance between patch and hand ≈14 mm FIG. 9 shows a free space radiation pattern boresight (equal phase and power on each array element) for the array of FIG. 8a. As can be seen, there is main lobe 920 which is centrally located with a side lobe 922 arranged on either side of the main lobe.

The codebook entries for obtaining a beamsteering tilt of 30° is shown in the table below.

| Index   | A1        | A2        | A3        | A4        |
|---------|-----------|-----------|-----------|-----------|
| x (30°) | 100% @ 0° | 100% @ 90° | 100% @ 180° | 100% @ 270° |

Figure 8B:
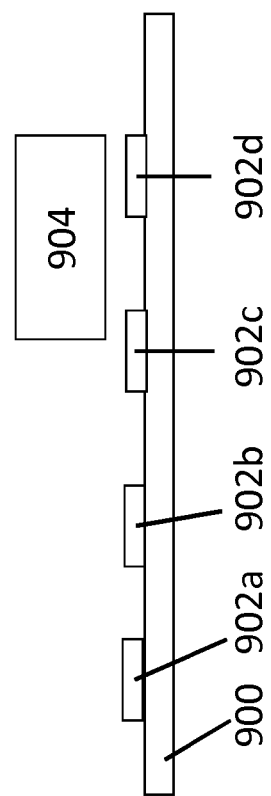
FIG. 8b shows the 1×4 antenna array of FIG. 8b with interference from a user.
Figure 8A:
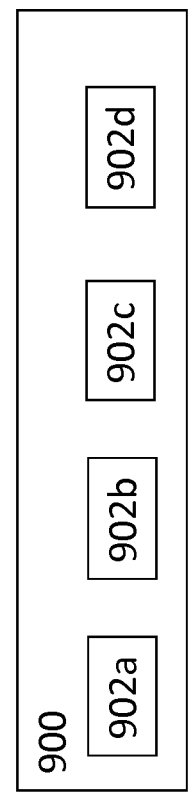
FIG. 8a shows a 1×4 antenna array.
Figure 10:
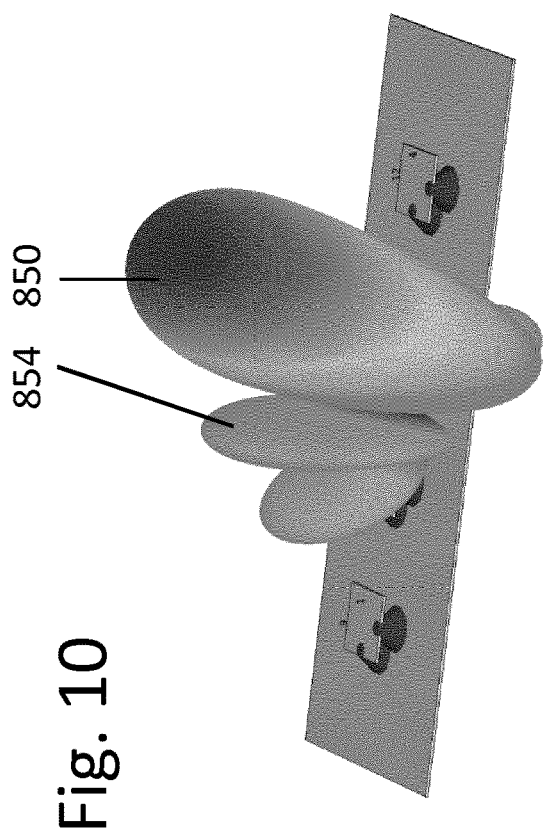
FIG. 10 shows a radiation pattern for the antenna array of FIG. 8a with a 30 degree tilt.
Figure 9:
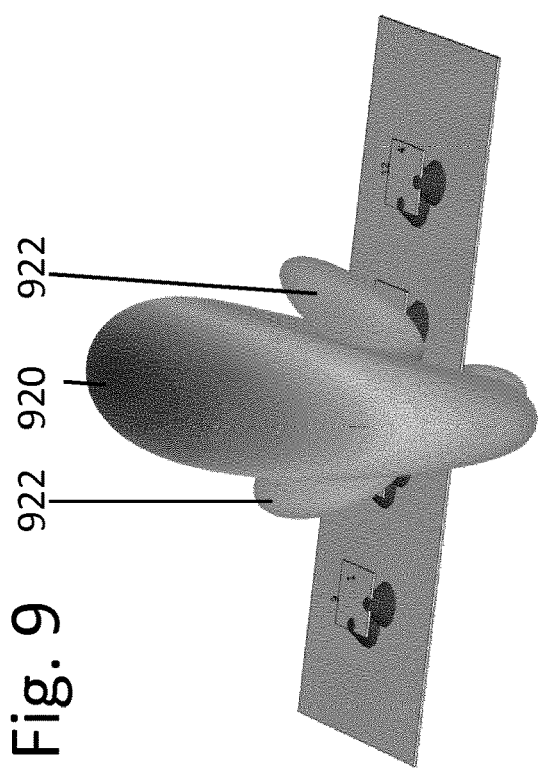
FIG. 9 shows a radiation pattern for the antenna array of FIG. 8a with equal phase and power on each array element.

For the antenna array shown in FIG. 8a, the antenna patterns are as shown in FIG. 10. FIG. 10 shows a three dimensional beam pattern with the main lobe 850 at a tilt of 30 degrees. A side lobe(not shown arranged on the side of the tilt direction of the main lobe may be smaller than the side lobe 854 arranged on the side away from the tilt direction of the main lobe.

Figure 11:
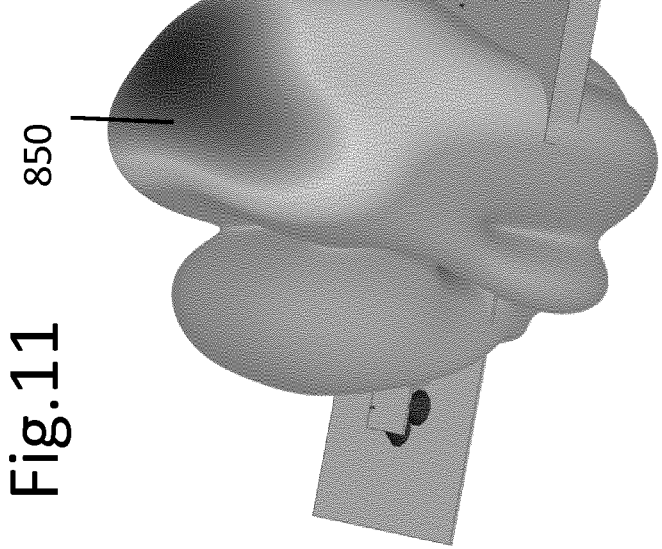
FIG. 11 shows a radiation pattern for the antenna array of FIG. 8b with a 30 degree tilt and no compensation.

For the antenna array shown in FIG. 8b, the antenna pattern is as shown in FIG. 11. This is without compensation. FIG. 11 shows a three dimensional beam pattern with the main lobe 850 at a tilt of 30 degrees. However as compared to FIG. 10, the main lobe shape, direction and size are distorted.

Figure 12B:
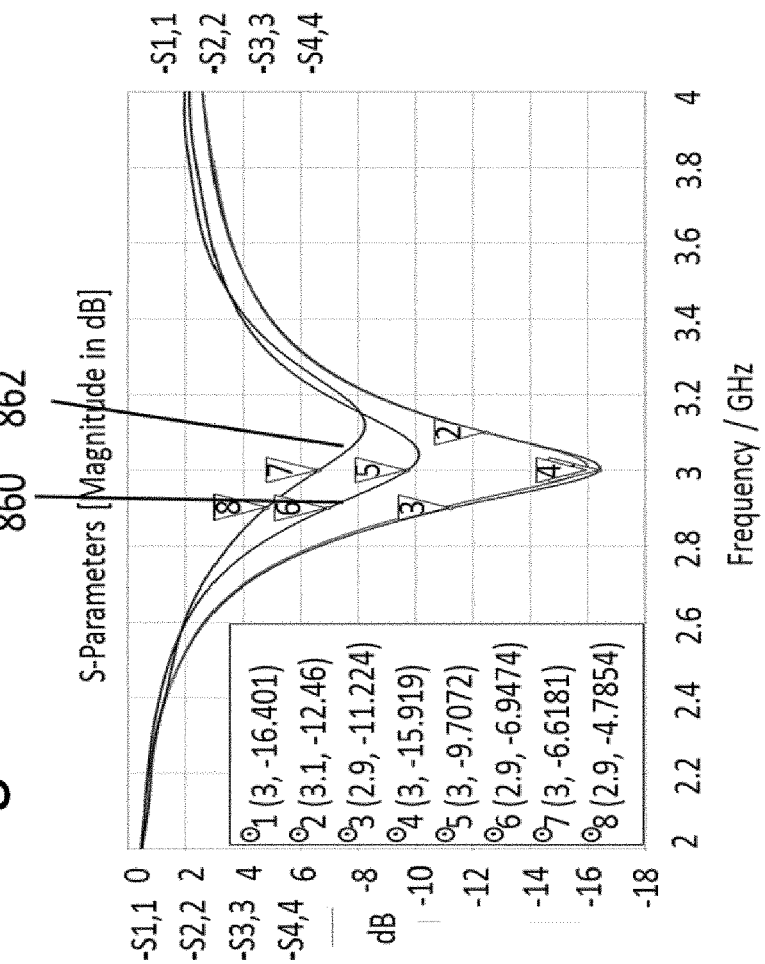
FIG. 12b shows a plot for the antenna array of FIG. 8b.
Figure 12A:
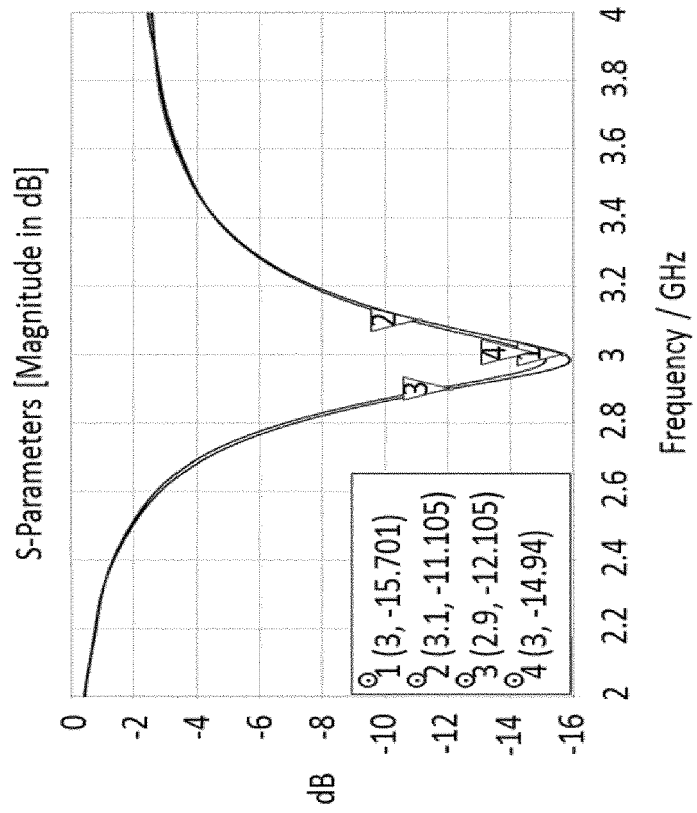

Reference is made to FIG. 12a which shows a reflected magnitude plot for each of the four array ports of the array of FIG. 8a. The graph shows reflected magnitude measured in dB against frequency. As can be seen from the graph, all four array ports have a very similar profile with a minimum reflected magnitude corresponding to the 3 GHz frequency with which the array is intended to be used.

Reference is made to FIG. 12b which shows a reflected magnitude plot for each of the four array ports of the array of FIG. 8b. The graph shows the reflected magnitude measured in dB against frequency. As can be seen from the graph, the two ports which are covered have a very much higher reflected magnitude as compared to the uncovered ports at the 3 GHz frequency with which the array is intended to be used. The end port, port 4 represented by line 862 is completely covered and the adjacent port, port 3 represented by line 860 is only partly covered. Port 4 is associated with a higher impedance than port 3 at the 3 GHz frequency.

Thus FIG. 12 shows that ports 3 and 4 are detuned due to the load of the hand and it may be beneficial to reduce the power delivered to these ports. The codebook which is used is updated as shown below, based on the power detector output where the power on port 4 is disabled and the power on port 3 is reduced by a factor of 2. The power reduction may be a function of the mismatch.

| Index | A1 | A2 | A3 | A4 |
|---|---|---|---|---|
| x (45°) | 100% @ 0° | 100% @ 90° | 50% @ 180° | Off |

Figure 13:
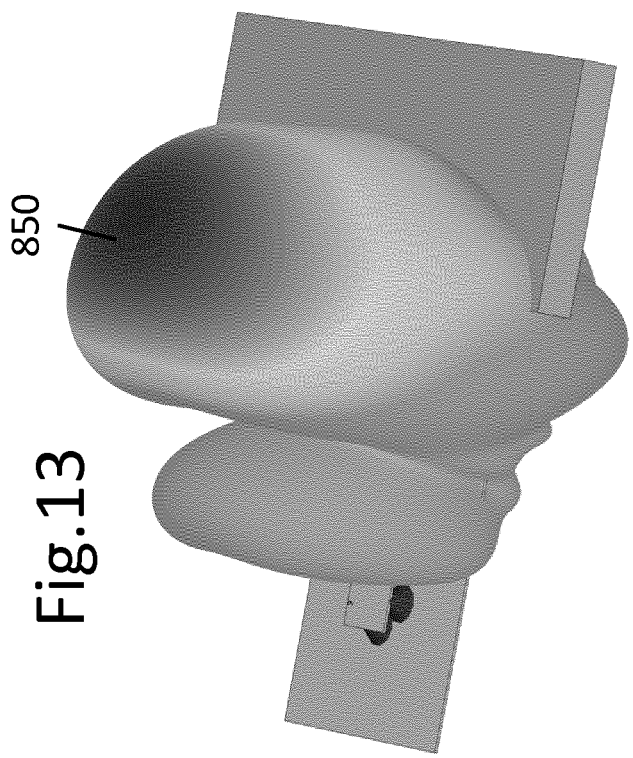
FIG. 13 shows a radiation pattern for the antenna array of FIG. 8b with a 30 degree tilt and compensation.

Reference is made to FIG. 13 which shows an updated radiation pattern for the array shown in FIG. 8b with the updated code book. The increase in gain, by utilizing the updated codebook is around 1.4 dB for this example, with a reduced power input level of 2 dB. The reduced power level input could be used as an additional power boost to gain a 3.4 dB gain improvement or kept at a current consumption reduction. There is also less distortion of the main lobe 850.

Some gain results for the 1×4 array at 3 GHz are shown in the table below.

| Freq. | Steering Angle | Uncompensated total realized gain | Compensated Realized Antenna Gain | Compensated PA Power Save/ Gain | Compensated Total | Free Space total realized gain |
|---|---|---|---|---|---|---|
| 2.9 GHz | 0° | 8.3 dB @ −7° | 9.6 dB @ −3° | 2.0 dB | 11.6 dB | 11.6 dB @ 0° |
| | 15° | 8.1 dB @ 5° | 9.6 dB @ 9° | 2.0 dB | 11.6 dB | 11.5 dB @ 14° |
| | 30° | 7.7 dB @ 17° | 9.2 dB @ 18° | 2.0 dB | 11.2 dB | 11.3 dB @ 29° |
| | 45° | 5.6 dB @ 25° | 7.8 dB @ 24° | 2.0 dB | 9.8 dB | 10.3 dB @ 44° |
| 3.0 GHz | 0° | 8.6 dB @ −6° | 10.0 dB @ −2° | 2.0 dB | 12.0 dB | 12.0 dB @ 0° |
| | 15° | 8.6 dB @ 6° | 10.0 dB @ 9° | 2.0 dB | 12.0 dB | 11.9 dB @ 14° |
| | 30° | 8.4 dB @ 17° | 9.8 dB @ 19° | 2.0 dB | 11.8 dB | 11.7 dB @ 28° |
| | 45° | 6.7 dB @ 26° | 8.6 dB @ 25° | 2.0 dB | 10.6 dB | 10.9 dB @ 43° |
| 3.1 GHz | 0° | 8.7 dB @ −5° | 10.1 dB @ −2° | 2.0 dB | 12.1 dB | 12.0 dB @ 0° |
| | 15° | 8.7 dB @ 7° | 10.1 dB @ 9° | 2.0 dB | 12.1 dB | 12.0 dB @ 13° |
| | 30° | 8.5 dB @ 18° | 9.9 dB @ 19° | 2.0 dB | 11.9 dB | 11.7 dB @ 27° |
| | 45° | 7.3 dB @ 28° | 8.8 dB @ 26° | 2.0 dB | 10.8 dB | 10.9 dB @ 41° |

Reference is made to FIG. 14 which shown another example of an 1×8 antenna array at @ 30 GHz. The antenna array 920 is provided with eight antenna elements 922a-h with a user object 924 interacting with the array. The object completely covers antenna elements 922g and 922h and only partially covers antenna element 922f.
The antenna has the following properties:
  Ground size: 50 mm×9 mm
  Patch height: 0.6 mm
  Patch Spacing: 0.5λ
  Substrate: εr=3.0 & tan δ=0.005
  Finger @ 30 Ghz: εr=4.8 & σ=42.5 S/m
  Distance between patch and finger≈1 mm
Below are the codebook entries for a beam steering tilt at 30° for the array of FIG. 14 with no user object.

| A1 | A2 | A3 | A4 | A5 | A6 | A7 | A8 |
|---|---|---|---|---|---|---|---|
| 100% @ 0° | 100% @ 90° | 100% @ 180° | 100% @ 270° | 100% @ 0° | 100% @ 90° | 100% @ 180° | 100% @ 270° |

Below are the codebook entries for a beam steering tilt at 30° for the array of FIG. 14 with the user object.

| A1 | A2 | A3 | A4 | A5 | A6 | A7 | A8 |
|---|---|---|---|---|---|---|---|
| 100% @ 0° | 100% @ 90° | 100% @ 180° | 100% @ 270° | 100% @ 0° | Off | Off | Off |

The table below shows gain results for a 1×8 array at 30 GHz utilizing the updated codebooks.

| Freq. | Steering Angle | Uncompensated total realized gain | Compensated Realized Antenna Gain | Compensated PA Power Save/Gain | Compensated Total | Free Space total realized gain |
|---|---|---|---|---|---|---|
| 29 GHz | 0° | 11.5 dB @ −4° | 12.5 dB @ −4° | 2.0 dB | 14.5 dB | 14.5 dB @ 0° |
| | 15° | 10.4 dB @ 10° | 11.4 dB @ 10° | 2.0 dB | 13.4 dB | 14.4 dB @ 14° |
| | 30° | 9.2 dB @ 22° | 9.9 dB @ 21° | 2.0 dB | 11.9 dB | 14.2 dB @31° |
| | 45° | 3.6 dB @ 35° | 5.1 dB @ 30° | 2.0 dB | 7.1 dB | 13.4 dB @ 49° |
| 30 GHz | 0° | 11.8 dB @ −4° | 12.9 dB @ −3° | 2.0 dB | 14.9 dB | 14.9 dB @ 0° |
| | 15° | 10.8 dB @ 10° | 11.7 dB @ 9° | 2.0 dB | 13.7 dB | 14.8 dB @ 15° |
| | 30° | 9.8 dB @ 22° | 10.5 dB @ 19° | 2.0 dB | 12.5 dB | 14.6 dB @ 29° |
| | 45° | 4.9 dB @ 36° | 6.1 dB @ 27° | 2.0 dB | 8.1 dB | 13.9 dB @ 47° |
| 31 GHz | 0° | 11.9 dB @ −3° | 13.0 dB @ −3° | 2.0 dB | 15.0 dB | 14.9 dB @ 0° |
| | 15° | 10.7 dB @ 10° | 11.8 dB @ 9° | 2.0 dB | 13.8 dB | 14.8 dB @ 14° |
| | 30° | 9.8 dB @ 23° | 10.7 dB @ 19° | 2.0 dB | 12.7 dB | 14.6 dB @ 28° |
| | 45° | 5.1 dB @ 30° | 6.7 dB @ 28° | 2.0 dB | 8.7 dB | 13.8 dB @ 45° |

Figure 15:
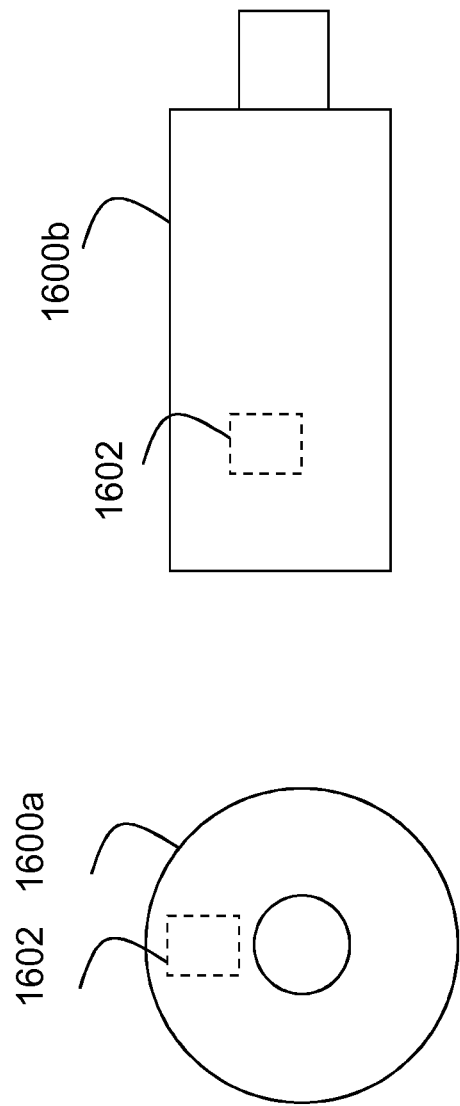
FIG. 15 shows a schematic representation of a non-volatile memory medium storing instructions which when executed by a processor allow a processor to perform one or more of the steps of the method of some embodiments.

FIG. 15 shows a schematic representation of non-volatile memory media 1600a (e.g. computer disc (CD) or digital versatile disc (DVD)) and 1600b (e.g. universal serial bus (USB) memory stick) storing instructions and/or parameters 1602 which when executed by a processor allow the processor to perform one or more of the steps of any of the methods of any of the embodiments.

Figure 17:
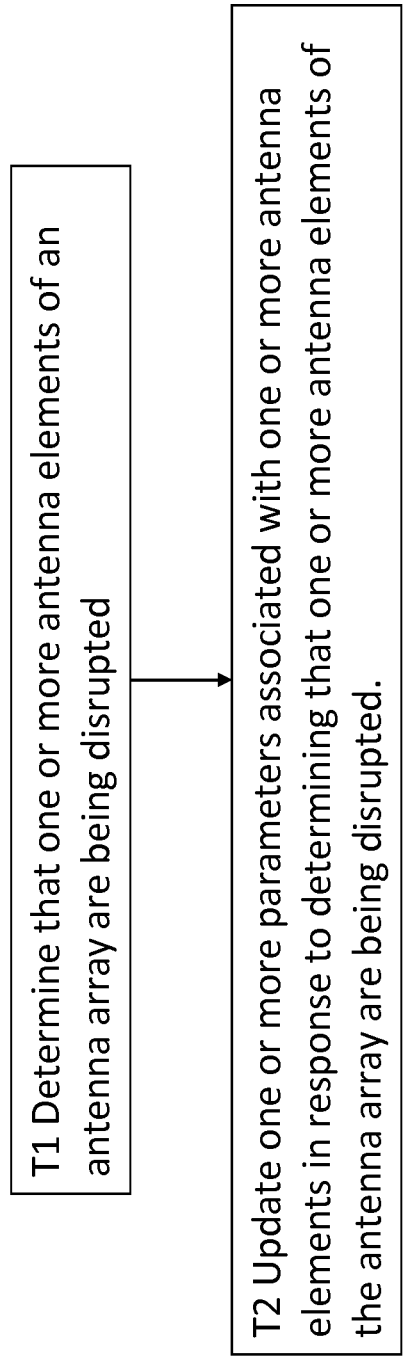
FIG. 17 shows another method of some embodiments.

Reference is made to FIG. 17 which shows a method of some embodiments. The method may be performed in an apparatus in a communications device, in a communications device, in an apparatus in a base station and/or in a base station.

In step T1, the method comprises determining that one or more antenna elements of an antenna array are being disrupted.

In step T2, the method comprises updating one or more parameters associated with one or more antenna elements in response to determining that one or more antenna elements of said array are being disrupted.

Figure 18:
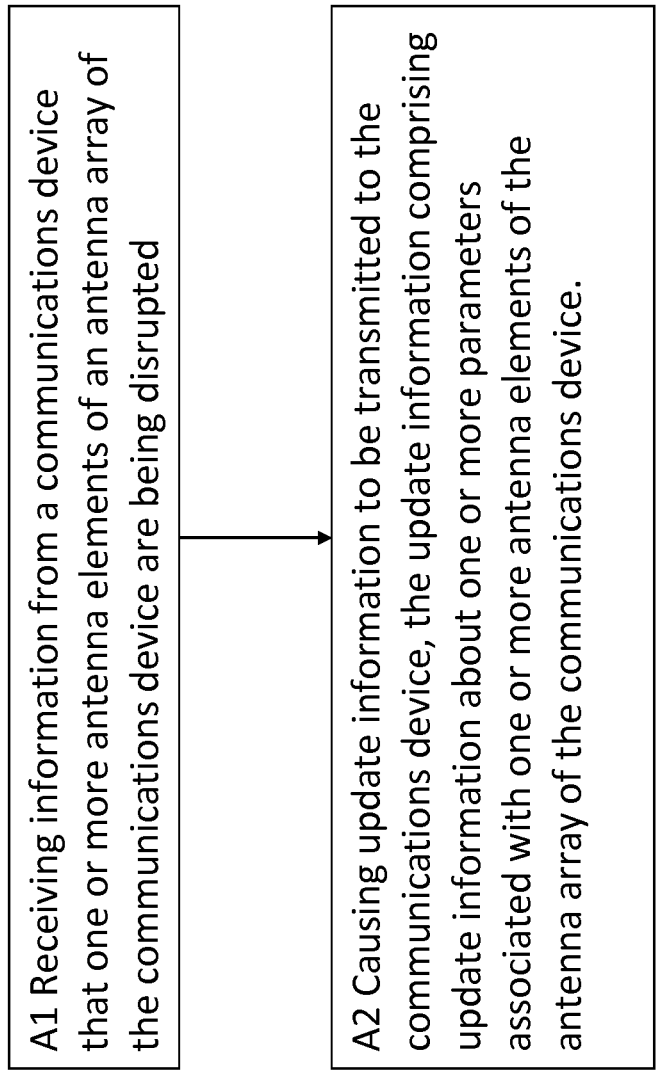
FIG. 18 shows a further method of some embodiments.

Reference is made to FIG. 18 which shows a method of some embodiments. The method may be performed in an apparatus in a base station and/or in a base station.

In step A1, the method comprises receiving information from a communications device that one or more antenna elements of an antenna array of the communications device are being disrupted.

In step A2, the method comprises causing update information to be transmitted to the communications device, the update information comprising update information about one or more parameters associated with one or more antenna elements of the array of the communications device.

It is noted that while the above describes example embodiments, there are several variations and modifications which may be made to the disclosed solution without departing from the scope of the present invention. These aspects may be transposed to other radio access technology systems other than those described purely by way of example.

The embodiments may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments may be implemented by computer software stored in a memory and executable by at least one data processor of the involved entities or by hardware, or by a combination of software and hardware. Further in this regard it should be noted that any procedures, e.g., in FIGS. 16 to 18 may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Alternatively or additionally, some embodiments may be implemented using circuitry. The circuitry may be configured to perform one or more of the functions and/or method steps previously described. That circuitry may be provided in the base station and/or in the communications device.

As used in this application, the term "circuitry" may refer to one or more or all of the following:

(a) hardware-only circuit implementations (such as implementations in only analogue and/or digital circuitry);

(b) combinations of hardware circuits and software, such as:

(i) a combination of analogue and/or digital hardware circuit(s) with software/firmware and (ii) any portions of hardware processor(s) with software (including digital signal processor(s)), software, and memory(ies) that work together to cause an apparatus, such as the communications device or base station to perform the various functions previously described; and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of exemplary and non-limiting examples a full and informative description of some embodiments However, various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

The invention claimed is:

1. An apparatus comprising:
at least one processor; and
at least one memory including computer program code;
the at least one memory and the computer program code configured to, with the at least one processor, cause the apparatus at least to:
determine, by a communications device, that one or more antenna elements of an antenna array are being disrupted;
transmit, by the communications device to a base station, information indicating that one or more antenna elements of the communications device are being disrupted;
receive, by the communications device from the base station, update information about one or more parameters associated with one or more antenna elements of the antenna array of the communications device; and
update, by the communications device, one or more parameters associated with the one or more antenna elements based on the received update information.

2. The apparatus as claimed in claim 1, wherein the computer program code and the at least one processor configured to cause the apparatus to update comprises the computer program code and the at least one processor configured to cause the apparatus to update one or more parameters by one of:
alter at least one of a power and phase applied to a signal provided to one or more of said antenna elements; and
alter at least one of a gain and phase applied to a signal received from one or more of said antenna elements.

3. The apparatus as claimed in claim 1, wherein the computer program code and the at least one processor configured to cause the apparatus to update comprises the computer program code and the at least one processor configured to cause the apparatus to update one or more parameters by one of:
switch off one or more of said one or more antenna elements that are being disrupted;
reduce a power applied to a signal provided to one or more of said one or more antenna elements that are being disrupted; and
reduce a gain applied to a signal received from one or more of said one or more antenna elements that are being disrupted.

4. The apparatus as claimed in claim 1, wherein the update information comprises an updated set of codebook entries providing one or more updated parameters;
wherein the computer program code and the at least one processor are configured to cause the apparatus to use the updated set of codebook entries for transmission of data.

5. The apparatus as claimed in claim 1, wherein the computer program code and the at least one processor are configured to cause the apparatus to determine that one or more antenna elements of the antenna array are being disrupted in dependence on a reflection constant for at least one antenna element.

6. The apparatus as claimed in claim 5, wherein the computer program code and the at least one processor are configured to cause the apparatus to compare said reflection constant to at least one threshold to determine one or more antenna elements of the antenna array are being disrupted.

7. The apparatus as claimed in claim 6, wherein the computer program code and the at least one processor are configured to cause the apparatus to determine said at least one threshold.

8. The apparatus as claimed in claim 6, wherein the computer program code and the at least one processor are configured to cause the apparatus to receive information on said at least one threshold from the base station.

9. The apparatus as claimed in claim 1, wherein the computer program code and the at least one processor are configured to cause the apparatus to determine that one or more antenna elements of the antenna array are being disrupted in dependence on an amplitude of at least one signal.

10. The apparatus of claim 1, wherein the received update information comprises an updated set of codebook entries received by the communications device from the base station;
wherein causing the apparatus to update comprises causing the apparatus to update one or more parameters associated with one or more antenna elements based on the updated set of codebook entries received from the base station.

11. The apparatus of claim 1, wherein the information about the one or more antenna elements of the antenna array that are being disrupted comprises at least one of:
information identifying one or more of the antenna elements that have been disrupted;
phase information;
a reflection constant; or
an updated set of codebook entries.

12. An apparatus comprising:
at least one processor; and
at least one memory including computer program code;
the at least one memory and the computer program code configured to, with the at least one processor, cause the apparatus at least to:
receive information from a communications device that one or more antenna elements of an antenna array of the communications device are being disrupted; and
cause update information to be transmitted to said communications device, said update information comprising update information about one or more parameters associated with one or more antenna elements of said array of said communications device.

13. The apparatus as claimed in claim 12, wherein the computer program code and the at least one processor are configured to cause the apparatus to determine an updated set of codebook entries in response to said information received from the communications device.

14. The apparatus as claimed in claim 12, wherein the computer program code and the at least one processor are configured to cause the apparatus to cause information on at least one threshold to be transmitted to said communications device, said at least one threshold being for use by the communications device to determine if at least one antenna element is being disrupted.

15. A method comprising:
determining, by a communications device, that one or more antenna elements of an antenna array are being disrupted;
transmitting, by the communications device to a base station, information indicating that one or more antenna elements of the communications device are being disrupted;
receiving, by the communications device from the base station, update information about one or more parameters associated with one or more antenna elements of the antenna array of the communications device; and
updating, by the communications device, one or more parameters associated with one or more antenna elements based on the received update information.

16. The method as claimed in claim 15, wherein the updating comprises updating one or more parameters by one of:
altering at least one of a power and phase applied to a signal provided to one or more of said antenna elements; and
altering at least one of a gain and phase applied to a signal received from one or more of said antenna elements.

17. The method as claimed in claim 15, wherein the updating comprises updating one or more parameters by one of:
switching off one or more of said one or more antenna elements that are being disrupted;
reducing a power applied to a signal provided to one or more of said one or more antenna elements that are being disrupted; and
reducing a gain applied to a signal received from one or more of said one or more antenna elements that are being disrupted.

18. The method as claimed in claim 15, wherein the update information comprises an updated set of codebook entries providing one or more updated parameters, further comprising using the updated set of codebook entries for transmission of data.

19. The method as claimed in claim 15, wherein the determining that one or more antenna elements of an antenna array are being disrupted comprises performing at least one of:
determining that one or more antenna elements of the antenna array are being disrupted in dependence on a reflection constant for at least one antenna element; and
determining that one or more antenna elements of the antenna array are being disrupted by comparing said reflection constant to at least one threshold to determine one or more antenna elements of the antenna array are being disrupted.

20. A method comprising:
receiving information from a communications device that one or more antenna elements of an antenna array of the communications device are being disrupted; and
causing update information to be transmitted to said communications device, said update information comprising update information about one or more parameters associated with one or more antenna elements of said antenna array of said communications device.

* * * * *